Feb. 3, 1970    TETSUO MAEDA    3,492,883

DRIVING CHAIN GEAR OF A BICYCLE

Filed Jan. 9, 1968    3 Sheets-Sheet 1

FIG. I.

INVENTOR
TETSUO MAEDA
BY
*Ernest G. Montague*
ATTORNEY.

Feb. 3, 1970 — TETSUO MAEDA — 3,492,883
DRIVING CHAIN GEAR OF A BICYCLE
Filed Jan. 9, 1968 — 3 Sheets-Sheet 2

INVENTOR
TETSUO MAEDA
BY
ATTORNEY.

Feb. 3, 1970  TETSUO MAEDA  3,492,883
DRIVING CHAIN GEAR OF A BICYCLE
Filed Jan. 9, 1968  3 Sheets-Sheet 3

INVENTOR
TETSUO MAEDA
BY
ATTORNEY

United States Patent Office 3,492,883
Patented Feb. 3, 1970

1

3,492,883
DRIVING CHAIN GEAR OF A BICYCLE
Tefsuo Maeda, 1/12, 1-chome, Hamadera-koen-machi, Sakai, Osaka, Japan
Filed Jan. 9, 1968, Ser. No. 696,609
Claims priority, application Japan, Dec. 14, 1967, 42/105,079
Int. Cl. F16h 11/08
U.S. Cl. 74—217                    6 Claims

ABSTRACT OF THE DISCLOSURE

A bicycle chain gear comprising an inside annular body, a first outside annular body disposed rotatably about the inside annular body, and ratchet means between the annular bodies for causing the first outside annular body to be jointly driven by the inside annular body when the latter is turned in a first direction, and for causing the inside annular body to be rotationally disconnected from the first outside annular body when the latter is independently rotating in the first direction. The bicycle chain gear includes an inner ring, and a second outside annular body disposed rotatably about the inner ring, and connecting means for causing the inner ring to be rotationally driven jointly by the second outside annular body when the latter is turned in the first direction and for causing the second outside annular body to be rotationally driven jointly when the inner ring is freely running in the first direction. The first and second outside annular bodies have gear teeth thereon, and a chain cooperatively engages the first and second outside annular bodies on the gear teeth, respectively, thereby causing either of the outside annular bodies to rotationally drive the other in the first direction via the chain. A pedal drives the inside annular body, the inner ring being connected for joint rotation to a rear wheel of the bicycle and a switching means can shift the chain on the gears when the chain is in motion, however the bicycle is in motion.

The present invention relates to a bicycle driving gear, in general, and to a bicycle driving gear, the chain of which can be freely switched either to a high or low gear without treading the pedals, in particular.

In conventional bicycles with reduction gears designed to change the speed of the bicycle by switching the chain to other chain gears of different diameters, the chain can be switched when the chain is driven by pedaling the wheel. However, it cannot be switched when the bicycle is brought to a stop or, if the chain does not rotate while running. Consequently, if the bicycle is stopped, with the chain left on the high gear, the cyclist must ride the bicycle and tread the pedals to switch the chain to the low gear for starting, or he must start running the bicycle with the chain remaining on the high gear. In either case, he is compelled to start treading the pedals with the chain on the high gear, which requires a difficult effort on his part, particularly when traveling uphill.

On the other hand, it is considerably inconvenient to necessarily pedal the wheel to rotate the chain in order to switch the chain to the low gear, even if this is done immediately before stopping the bicycle.

It is an object of the present invention to provide a bicycle driving gear which avoids the above-mentioned disadvantages of conventional bicycle driving gears.

2

It is another object of the present invention to provide a driving chain gear of a bicycle or the like, comprising an inside annular body, a first outside annular body annularly disposed rotatably about the inside annular body, ratchet means disposed between the annular bodies for causing the first outside annular body to be jointly rotationally driven by the inside annular body when the latter is turned in a first direction and for causing the inside annular body not to be rotationally driven by the first outside annular body when the latter is independently rotating in the first direction without driving the inside annular body, an inner ring, a second outside annular body disposed rotatably about the inner ring, connecting means for causing the inner ring to be rotationally driven jointly by the second outside annular body when the latter is turned in the first direction and for causing the second outside annular body to be rotationally driven jointly when the inner ring is freely running in the first direction, the first and second outside annular bodies, including gears thereon, and a chain cooperatively engaging the first and second outside annular bodies on the gears, thereon, respectively, thereby causing either of the outside annular bodies to rotationally drive the other via the chain in the first direction.

With the above and other objects in view which will become apparent in the following detailed description, the present invention will be clearly understood in connection with the accompanying drawings, in which.

Figure 1:
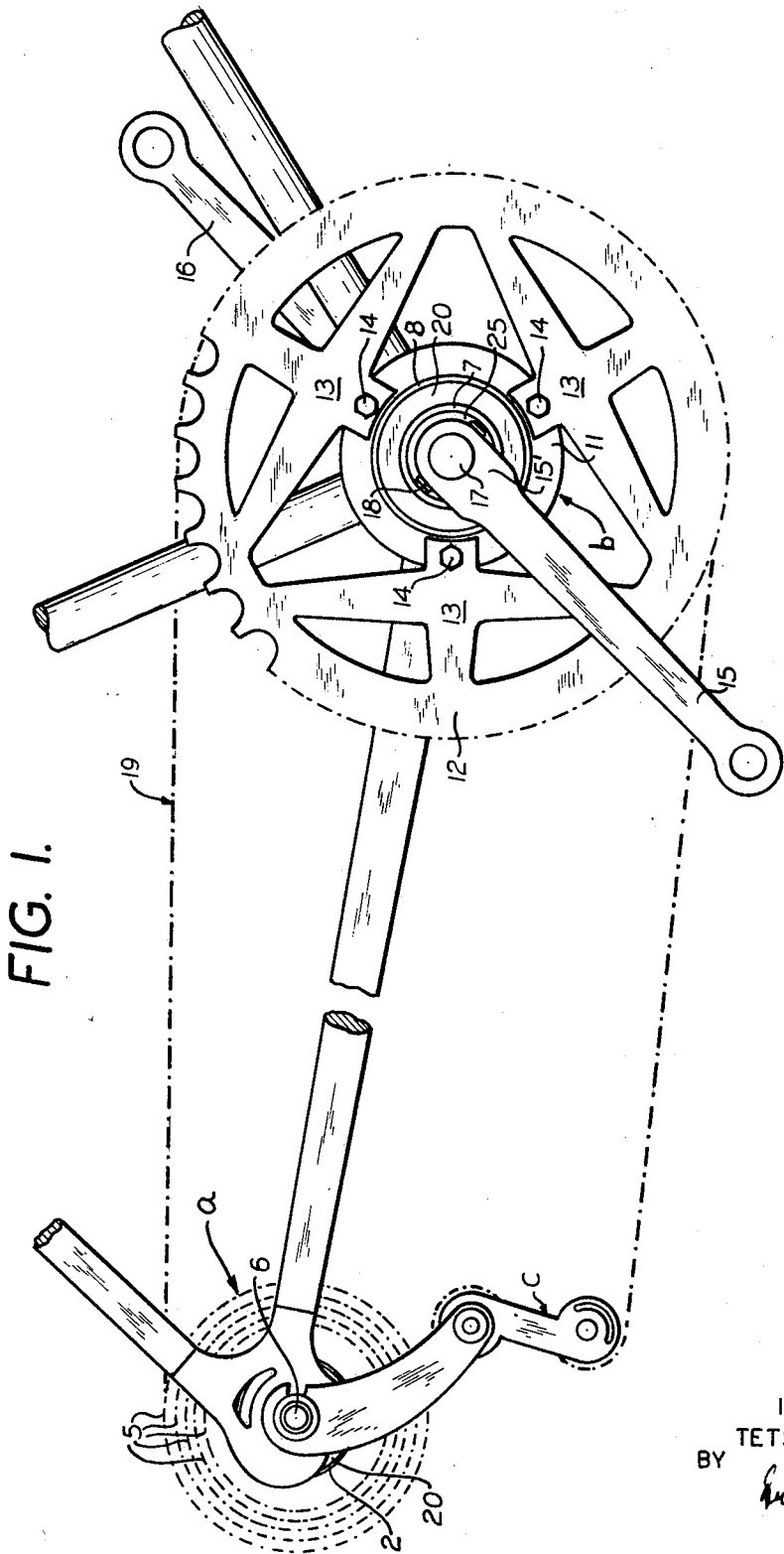
FIGURE 1 is a front elevation view of the driving gear partly broken away.
Figure 2:
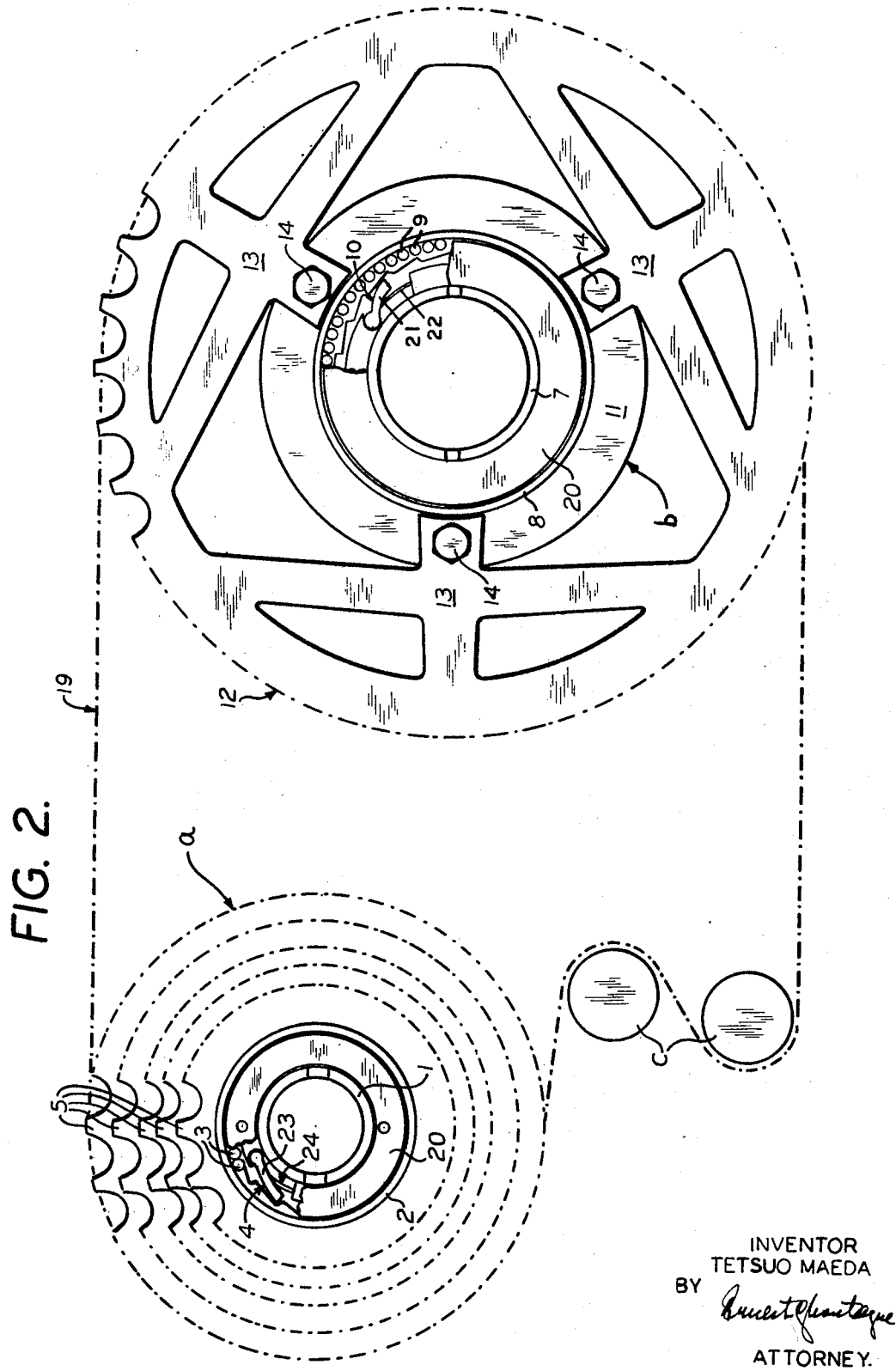
FIG. 2 is a front elevation view partly in section and illustrating the relation between the free wheel and the free mechanism.
Figure 3:
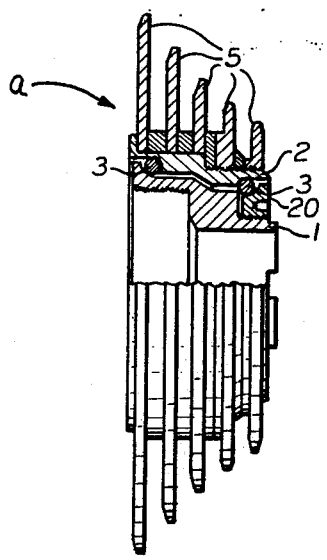
FIG. 3 is a partial axial sectional view of the free wheel.
Figure 4:
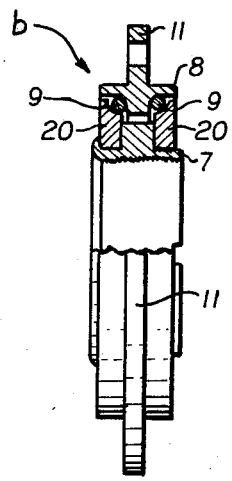
FIG. 4 is a partial axial sectional view of the free mechanism.

Referring now to the drawings, bearings 3 are arranged between an inner ring 1 and a body 2 thereabout to allow both the inner ring 1 and the body 2 to freely rotate. A ratchet mechanism 4 is arranged between the inner ring 1 and the body 2, and a plurality of driven chain gears 5 are arranged on the periphery of the body 2 so that a multistage free wheel is formed, which is fixed to the rear hub of the bicycle. This is commonly known also in conventional bicycles and no further description is required.

Bearings 9 are interposed between an inside annular body 7 and an outside annular body 8 to allow both of these bodies to freely rotate. A ratchet mechanism 10 is arranged between the annular bodies 7 and 8. Fixed on the periphery of the outside annular body 8 is an annular flange 11 constituting a free mechanism $b$, which is fixed to the inside edge of a driving chain gear 12. Three fixing arms 13 equally spaced from each other radially arranged on the inside of the driving chain gear 12, and the flange 11 on the outside annular body 8, are placed one over the other and connected together by binding bolts 14 so as to constitute an integral body.

Referring now again to the drawings, and in particular to FIG. 1, cranks 15 and 16, with pedals, are shown. Arranged on one end 15' of the crank 15 is a convex part 25 projecting outwardly, which is inserted into the interior of the inside annular body 7 preferably by screwing so as to constitute an integral body. In the end 15' of the crank 15 and the end of the crank 16, axle holes, respectively, are formed which pierce through the cranks from the outside to the inside. Inserted into these axle holes are both ends of axle 17 which are bound together by check pins 18, so that the cranks 15 and 16 cannot separate from the axle 17. In conventional bicycles, this axle 17 is held rotationally at the points of the frame of the bicycle where cranks are axially arranged, but, by fixing the cranks 15 and 16 to the axle 17, the driving chain gear 12 can be fixed also through the free mechanism b.

The speed change gear c is fixed to and held at one end of hub bolt 6, as shown in FIG. 1. The speed change gear serves to switch chain 19 (which is arranged between the driving chain gear 12 and one of the driven chain gears 5) to another of the driven chain gears 5. The bearings have side plates 20 as shown in FIGS. 1–4.

In the driving chain gear according to the present invention, the free wheel a is fixed to the rear hub of the bicycle; the free mechanism b is positioned between the cranks 15 and 16 and the driving chain gear 12; and a spring 24 acting upon a pawl 23 of the ratchet mechanism 4 in the free wheel a is made stronger than a spring 22 acting upon the pawl 21 of the ratchet mechanism 10 in the free mechanism b, so that the free wheel a cannot race more than the free mechanism b and the chain can be switched without pedaling the wheel.

When the bicycle is driven by treading the pedals, the pawl 21 of the ratchet 10 of the free mechanism b, will act so that the inside annular body 7 and the outside annular body 8 are connected for joint rotatable movement and the driving chain gear 12 will rotate. As the chain 19 rotates, the bicycle runs normally, and when treading the pedal, the chain rotates and, if the speed change lever (not shown), which operates the speed change gear, is actuated, the chain will be switched to another of the chain gears 5 of a different diameter and the speed of the bicycle will change.

When the pedal is not being tread, i.e., if the bicycle is freely running without rotating cranks 15 and 16, e.g., when going downhill, the inner ring 1 freely runs clockwise, and the free wheel a races less than the free mechanism b. As a result, to the contrary of conventional bicycles, the entire free wheel a, the chain 19 and the chain gear 12 will rotate together with the rear wheel of the bicycle, so that, between the inside annular body 7 of the free mechanism b and the outside annular body 8, racing will take place. In such a condition the chain can also be switched to the other gears of different diameters by operating the speed change level.

Consequently, when the bicycle stops running while the chain is in high gear, it can be switched to low gear, simply pushing the bicycle slightly forward in order to rotate its wheels and then by operating the speed change level, so that it can readily start running in low gear, thereby allowing the speed change gear to be operated most advantageously.

For the same reason as above, it is not necessary to tread the pedals immediately before stopping the bicycle, as heretofore, in order to switch the gear from the high gear to the low gear. Instead the chain can be switched to the low gear while running due to inertia.

The arrangement of the ratchet mechanism 4 in the free wheel a is for safety in the event obstacles get between the chain 19 and the driven chain gear 5, while running.

When operating the mechanism of the present invention, it is necessary to make the racing of the free mechanism b different from that of the free wheel a in consideration of the resistance caused by switching the chain.

While I have disclosed one embodiment of the present invention, it is to be understood that this embodiment is given by example only, and not in a limiting sense.

I claim:
1. A driving chain gear of a bicycle or the like, comprising
   an inside annular body,
   a first outside annular body annularly disposed rotatably about said inside annular body,
   ratchet means disposed between said annular bodies for causing said first outside annular body to be jointly rotationally driven by said inside annular body when the latter is turned in a first direction and for causing said inside annular body not to be rotationally driven by said first outside annular body when the latter is independently rotating in said first direction without driving said inside annular body,
   an inner ring,
   a second outside annular body disposed rotatably about said inner ring,
   connecting means for causing said inner ring to be rotationally driven jointly by said second outside annular body when the latter is turned in said first direction and for causing said second outside annular body to be rotationally driven jointly when said inner ring is freely running in said first direction,
   said first and second outside annular bodies including gears thereon, and
   a chain cooperatively engaging said first and second outside annular bodies on said gears thereon, respectively, thereby causing either of said outside annular bodies to rotationally drive the other via said chain in said first direction.

2. The driving chain gear, as set forth in claim 1, wherein
   said connecting means comprises a ratchet device.

3. The driving chain gear, as set forth in claim 2, wherein
   said ratchet means and said ratchet device are disposed relative to each other in different directions.

4. The driving chain gear, as set forth in claim 3, wherein
   said ratchet means and said ratchet device each include a pawl, ratchet teeth and a spring urging said pawl against said ratchet teeth, and
   said spring of said ratchet device is stronger than said spring of said ratchet means, causing said pawl of said ratchet device to be unable to slip over said ratchet teeth of said ratchet device when said inner ring is freely running in said first direction thereby driving said second outside annular body in said first direction and thereby driving said first outside annular body in said first direction via said chain, and causing said pawl of said ratchet means to slip over said ratchet teeth of said ratchet means, whereby said first outside annular body freely races relative said inside annular body.

5. The driving chain gear, as set forth in claim 4, wherein
   said pawl of said ratchet device is secured to said inner ring and points in a direction opposite to said first direction,
   said ratchet teeth of said ratchet device is disposed on said second outside annular body,
   said pawl of said ratchet means is secured to said inside annular body and points in a said first direction, and
   said ratchet teeth of said ratchet means is disposed on said first outside annular body.

6. The driving chain gear, as set forth in claim 1, further comprising
   pedal means for driving said inside annular body in said first direction,
   said inner ring operatively adapted to be connected to a rear wheel of said bicycle for joint rotation therewith, and means for switching said chain on said gears of said second outside annular body when said chain is in motion.

References Cited

UNITED STATES PATENTS 3,081,641  3/1963  Iseman _____ 74—217

FOREIGN PATENTS 491,109  8/1938  Great Britain.

FRED C. MATTERN, Jr., Primary Examiner

JAMES A. WONG, Assistant Examiner

U.S. Cl. X.R.

192—48.92; 280—236